United States Patent
Akiyoshi

(10) Patent No.: US 9,276,852 B2
(45) Date of Patent: Mar. 1, 2016

(54) COMMUNICATION SYSTEM, FORWARDING NODE, RECEIVED PACKET PROCESS METHOD, AND PROGRAM

(75) Inventor: Ippei Akiyoshi, Tokyo (JP)

(73) Assignee: NEC CORPORATION, Tokyo (JP)

( * ) Notice: Subject to any disclaimer, the term of this patent is extended or adjusted under 35 U.S.C. 154(b) by 68 days.

(21) Appl. No.: 13/993,985

(22) PCT Filed: Sep. 6, 2011

(86) PCT No.: PCT/JP2011/004978
§ 371 (c)(1),
(2), (4) Date: Jun. 13, 2013

(87) PCT Pub. No.: WO2012/090355
PCT Pub. Date: Jul. 5, 2012

(65) Prior Publication Data
US 2013/0259052 A1    Oct. 3, 2013

(30) Foreign Application Priority Data
Dec. 28, 2010    (JP) ................. 2010-291769

(51) Int. Cl.
*H04L 29/06*    (2006.01)
*H04L 12/741*   (2013.01)
*H04L 12/935*   (2013.01)
(Continued)

(52) U.S. Cl.
CPC .............. *H04L 45/745* (2013.01); *H04L 45/38* (2013.01); *H04L 49/3009* (2013.01); *H04L 63/0227* (2013.01); *H04L 45/42* (2013.01)

(58) Field of Classification Search
CPC ....... H04L 47/32; H04L 47/50; H04L 69/166; H04L 69/22

USPC .................. 370/389, 230, 394, 412
See application file for complete search history.

(56) References Cited

U.S. PATENT DOCUMENTS 8,451,817 B2*    5/2013    Cheriton .................. 370/349
2003/0086415 A1*   5/2003    Bernhard et al. .......... 370/352
2004/0267945 A1*  12/2004    Reiss ..................... 709/229

(Continued)

FOREIGN PATENT DOCUMENTS

| WO | WO 2008/095010 A1 | 8/2008 |
| WO | WO 2010/103909 A1 | 9/2010 |
| WO | WO 2010/110234 A1 | 9/2010 |

OTHER PUBLICATIONS

International Search Report in PCT/JP2011/004978 dated Oct. 11, 2011.

(Continued)

*Primary Examiner* — Dang Ton
*Assistant Examiner* — Sai Aung
(74) *Attorney, Agent, or Firm* — McGinn IP Law Group, PLLC

(57) ABSTRACT

A communication system includes: a control apparatus setting a process rule defining a process content appropriate to a received packet in a forwarding node; and a forwarding node comprising a packet process unit processing a received packet in accordance with the process rule. The forwarding node further includes: a request unit transmitting a process rule setting request to the control apparatus if the received packet is a first packet for which the process rule is not set; and a restriction unit restricting transmission of the setting request for a second packet satisfying a condition obtained from the first packet.

13 Claims, 13 Drawing Sheets

(51) Int. Cl.
*H04L 12/721* (2013.01)
*H04L 12/717* (2013.01)

(56) References Cited

U.S. PATENT DOCUMENTS

2006/0215662 A1* 9/2006 Zhang et al. .................. 370/394
2007/0291751 A1* 12/2007 Smith et al. ................... 370/389
2008/0189769 A1 8/2008 Casado et al.

OTHER PUBLICATIONS

Nick McKeown et al, "OpenFlow: Enabling Innovation in Campus Networks", [last retrieved on Dec. 1, 2010] Mar. 14, 2008, Internet <URL: http://www.openflowswitch.org//documents/ openflow-wp-latest.pdf>.

"OpenFlow Switch Specification" Version 1.1.0. (Wire Protocol 0x01) [last retrieved on Dec. 1, 2010] Dec. 31, 2009 Internet <URL: http://www.openflowswitch.org/documents/openflow-spec-v1.0.0.pdf>.

Rob Sherwood et al: "FlowVisor: A Network Virtualization Layer", Internet Citation, Oct. 14, 2009, pp. 1-15, XP002639208, Retrieved from the Internet: URL:http://www.openflow.org/downloads/technicalreports/openflow-tr-2009-1-flowvisor.pdf> [retrieved on May 27, 2011].

Casado M et al: "Ethane: taking control of the enterprise", Applications, Technologies, Architectures, and Protocols for Computer Communication: Proceedings of the 2007 Conference on Applications, Technologies, Architectures, and Protocols for Computer Communications, Aug. 27-31, 2007 vol. 37, No. 4, Aug. 27, 2007, pp. 1-12, XP002531272.

Rodrigo Braga et al: "Lightweight DDoS flooding attack detection using NOX/Open Flow", Local Computer Networks (LCN), 2010 IEEE 35th Conference On, IEEE, Oct. 10, 2010, pp. 408-415, XP031986806, DOI: 10.1109/LCN.2010.5735752.

\* cited by examiner

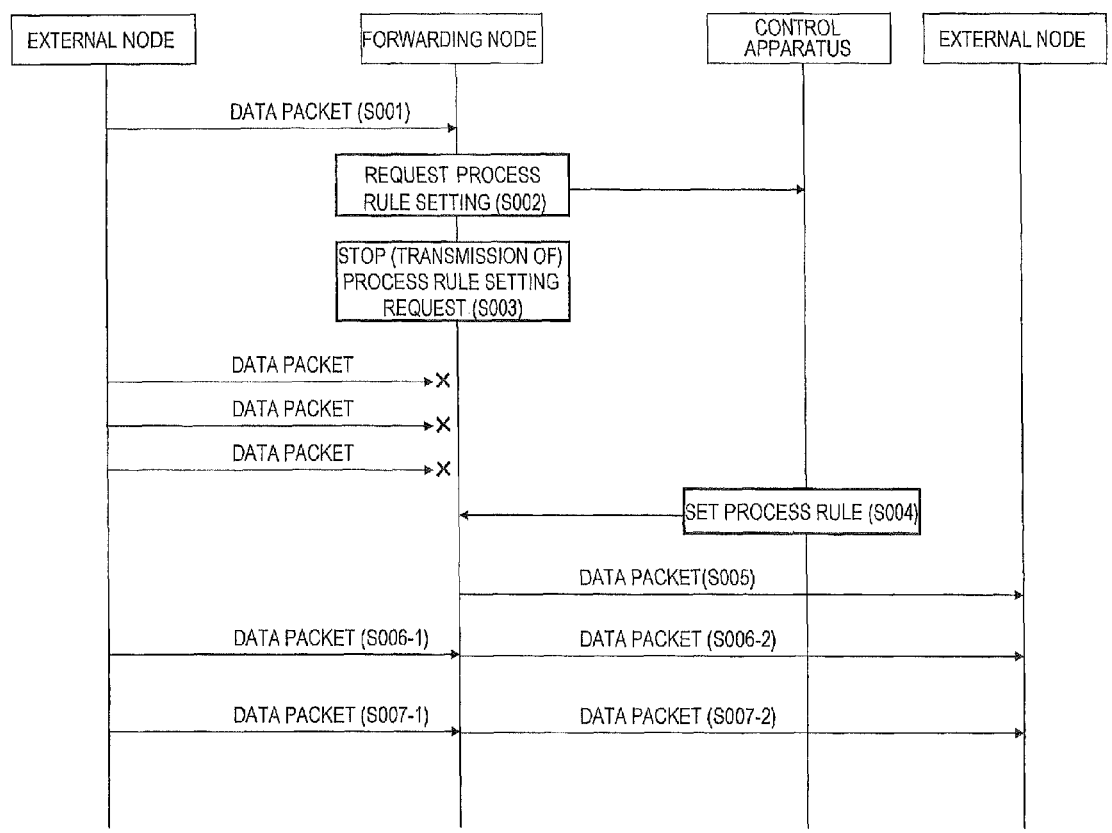

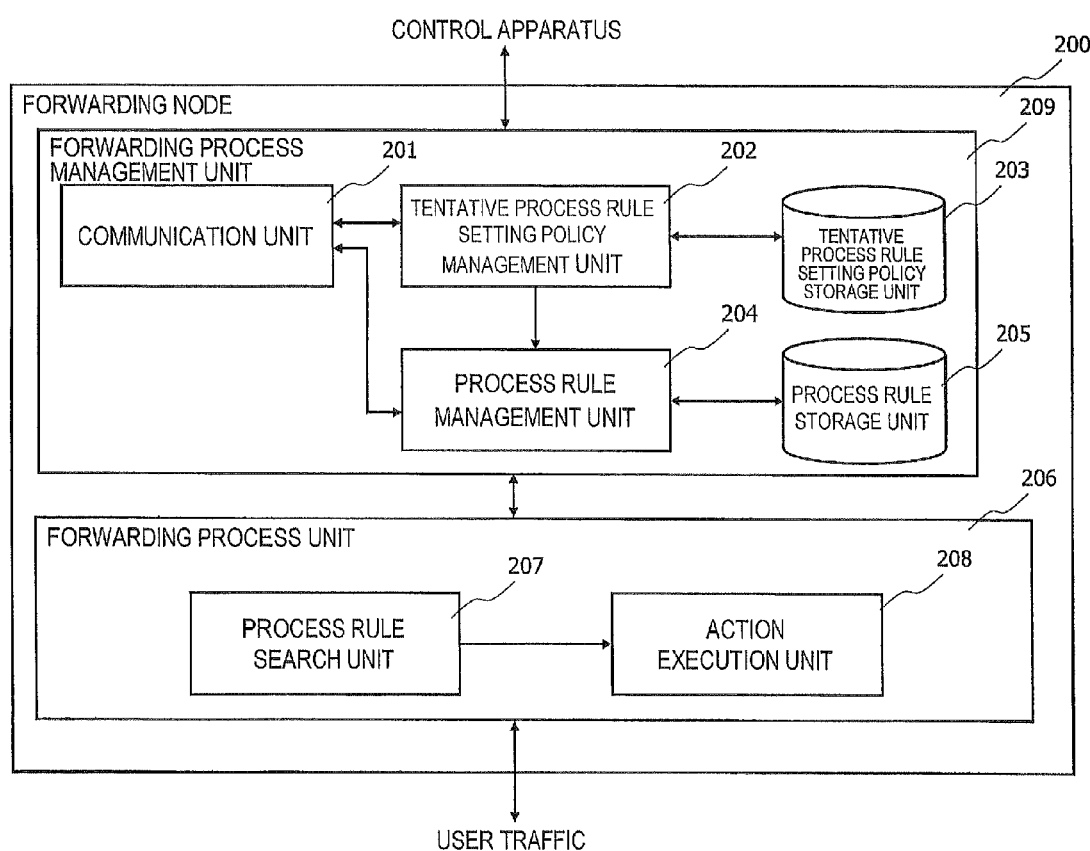

Fig. 4

| POLICY | FLOW INFORMATION | TENTATIVE PROCESS RULE SETTING POLICY |
|---|---|---|
| Policy#1 | inport = #1 or #2 or #3 | DISCARD PACKETS THAT MATCH CONDITIONS WHERE INPUT PORT, SOURCE MAC, AND SOURCE IP ARE IDENTICAL TO THAT OF THE RECEIVED PACKET WHOSE PROCESS RULE IS NOT REGISTERED AND THE OTHER FIELDS ARE WILDCARDS. TIMER REPRESENTS 10 SECONDS. |
| Policy#2 | inport = #4 or #5 or #6 | DISCARD PACKETS THAT MATCH CONDITIONS WHERE INPUT PORT IS IDENTICAL TO THAT OF THE RECEIVED PACKET WHOSE PROCESS RULE IS NOT REGISTERED AND THE OTHER FIELDS ARE WILDCARDS. TIMER REPRESENTS 10 SECONDS. |
| .. | .. | .. |

Fig. 5

| Identification Rule | Priority Order | Actions |
|---|---|---|
| Flow#1 | 1000 | Forward to Port#1 |
| Flow#2 | 1000 | Forward to Port#2 |
| .. | .. | .. |
| Tentative Flow#1 | 100 | Discard |
| .. | .. | .. |
| All Wildcards | 1 | Packet-In to Control Apparatus |

Fig. 11

| Matching Rules | Priority Order | Actions |
|---|---|---|
| Flow#1 | 1000 | Forward to Port#1 |
| Flow#2 | 1000 | Forward to Port#2 |
| : : | : : | : : |
| Tentative Flow#1 | 100 | Discard |
| : : | : : | : : |
| Flow#N (inport = #1 or # 2 or #3) | 10 | Application of Policy#1 and Packet-In to Control Apparatus |
| Flow#N+1 (inport = #4 or #5 or #6) | 10 | Application of Policy#2 and Packet-In to Control Apparatus |
| : : | : : | : : |
| All Wildcards | 1 | Packet-In to Control Apparatus |

Fig. 13

Header Fields; MATCHING RULE

| Wildcards | In Port | Ether SA | Ether DA | Ether type | VLAN ID | VLAN PCP | IP SA | IP DA | IP proto | IP ToS bits | TCP/UDP src port | TCP/UDP dst port | Counters | Actions |

US 9,276,852 B2

COMMUNICATION SYSTEM, FORWARDING NODE, RECEIVED PACKET PROCESS METHOD, AND PROGRAM

TECHNICAL FIELD

Reference to Related Application

The present invention is based upon and claims the benefit of the priority of Japanese patent application No. 2010-291769, filed on Dec. 28, 2010, the disclosure of which is incorporated herein in its entirety by reference thereto.

The present invention relates to a communication system, a forwarding node, a received packet process method, and a program. In particular, it relates to: a communication system realizing communication by using a forwarding node processing a received packet in accordance with a process rule matching a received packet; a forwarding node; a received packet process method; and a program.

BACKGROUND

In recent years, a technique referred to as OpenFlow is proposed (see Patent Literature (PTL) 1 and Non Patent Literatures (NPL) 1 and 2). In OpenFlow, communication is deemed as an end-to-end flow, and routing control, failure recovery, load distribution, and optimization are executed for each flow. An OpenFlow switch specified in Non Patent Literature 2 includes a secure channel for communication with an OpenFlow controller serving as a control apparatus. The OpenFlow switch operates in accordance with a flow table appropriately added or rewritten by the OpenFlow controller. In the flow table, a group of: a matching rule (header fields) matched against packet headers; flow statistics information (counters); and actions defining process contents are defined for each flow (see FIG. 13).

For example, upon receiving a packet, the OpenFlow switch searches the flow table for an entry having a matching rule (see header fields in FIG. 13) that matches header information of the received packet. As a result of the search, if an entry matching the received packet is found, the OpenFlow switch updates the flow statistics information (counters) and executes process contents described in the action field of the entry on the received packet (packet transmission from a specified port, flooding, discard, or the like). On the other hand, as a result of the search, no entry matching the received packet is found, the OpenFlow switch forwards the received packet to the OpenFlow controller via the secure channel to request the OpenFlow controller to determine a packet route based on the source and destination of the received packet. Upon receiving a flow entry realizing the route, the OpenFlow switch updates the flow table. In this way, the OpenFlow switch uses an entry stored in the flow table as a process rule to forward a packet.

CITATION LIST

Patent Literature (PTL)

[PTL 1]
International Publication No. WO2008/095010

Non Patent Literature (NPL)

[NPL 1]
Nick McKeown and seven others, "OpenFlow: Enabling Innovation in Campus Networks", [online], searched on Dec. 1, 2010, Internet <URL:http://www.openflowswitch.oredocuments/openflow-wp-latest.pdf>

[NPL 2]
"OpenFlow Switch Specification" Version 1.0.0. (Wire Protocol 0x01), searched on Dec. 1, 2010, Internet <URL: http://www.openflowswitch.org/documents/openflow-spec-v1.0.0.pdf>

SUMMARY

The disclosures of the above cited Patent and Non Patent Literatures are incorporated herein in their entirety by reference thereto.

The following analysis is given based on the present invention.

As in the above OpenFlow, in a network where a control apparatus determines packet process contents in response to a request from a forwarding node belonging to the control apparatus, the forwarding node can be configured simply, counted as a meritorious advantage. However, if the control apparatus is flooded with process rule setting requests from forwarding nodes in a certain period, the control apparatus could be subjected to a considerable amount of load. In addition, a possibility for a DoS attack (Denial of Service attack) against the control apparatus by using such mechanism also needs to be considered.

The present invention has been made in view of the above circumstances, and it is an object of the present invention to provide: a communication system that can prevent transmission of a flood of process rule setting requests from a certain forwarding node (or nodes) to a control apparatus and that can improve resistance to DoS attacks; a forwarding node; a received packet process method; and a program.

According to a first aspect, there is provided a communication system, comprising: a control apparatus setting a process rule defining a process content appropriate to a received packet in a forwarding node; and at least one forwarding node, comprising: a packet process unit processing a received packet in accordance with the process rule; a request unit transmitting a process rule setting request to the control apparatus if the received packet is a first packet for which the process rule is not set; and a restriction unit restricting transmission of the setting request for a second packet satisfying a condition obtained from the first packet.

According to a second aspect, there is provided a forwarding node, comprising: a packet process unit processing a received packet in accordance with a process rule defining a process content appropriate to a received packet; a request unit transmitting a process rule setting request to the control apparatus with respect to a first packet, among the received packet(s), for which the process rule is not set; and a restriction unit restricting transmission of the setting request for a second packet satisfying a condition obtained from the first packet.

According to a third aspect, there is provided a received packet process method, comprising: transmitting, when processing a received packet in accordance with a process rule defining a process content appropriate to a received packet if no process rule matching the received packet is set, a process rule setting request to a predetermined control apparatus for a first packet for which the process rule is not set; and restricting transmission of the process rule setting request for a second packet satisfying a condition obtained from the first packet. The present method is connected to a certain machine referred to as a forwarding node processing a received packet in accordance with the process rule.

According to a fourth aspect, there is provided a program, causing a computer that is included in a forwarding node comprising a packet process unit processing a received packet in accordance with a process rule defining a process content appropriate to a received packet to execute: transmitting a process rule setting request to a predetermined control apparatus for a first packet for which the process rule is not set; and restricting the process rule setting request for a second packet satisfying a condition obtained from the first packet. This program can be recorded in a computer-readable recording medium which may be a non-transient recording medium. Namely, the present invention can be realized as a computer program product.

In a particular mode, the program may be used for executing/implementing at least a part of the steps constituting the method, or the program may be installed in a memory unit of the forwarding unit for implementing the forwarding unit as an really active element (component) of the communication apparatus or system The meritorious effects of the present invention are summarized as follows.

According to the present disclosure, it is possible to prevent transmission of a flood of requests from a certain forwarding node to a control apparatus that determines a packet process content in response to a request from a forwarding node belonging to the control apparatus. In addition, DoS attacks against the control apparatus can be made difficult.

BRIEF DESCRIPTION OF DRAWINGS

FIG. 2 illustrates an outline of the present invention.
FIG. 3 is a block diagram illustrating a configuration of a forwarding node according to a first exemplary embodiment of the present invention.
FIG. 4 illustrates tentative process rule setting policies stored in a tentative process rule setting policy storage unit in the forwarding node according to the first exemplary embodiment of the present invention.
FIG. 5 illustrates process rules stored in a process rule storage unit in the forwarding node according to the first exemplary embodiment of the present invention.
FIG. 11 illustrates process rules stored in a process rule storage unit in the forwarding node according to the second exemplary embodiment of the present invention.
FIG. 13 illustrates a configuration of a flow entry described in Non Patent Literature 2.

PREFERRED MODES

Figure 1:
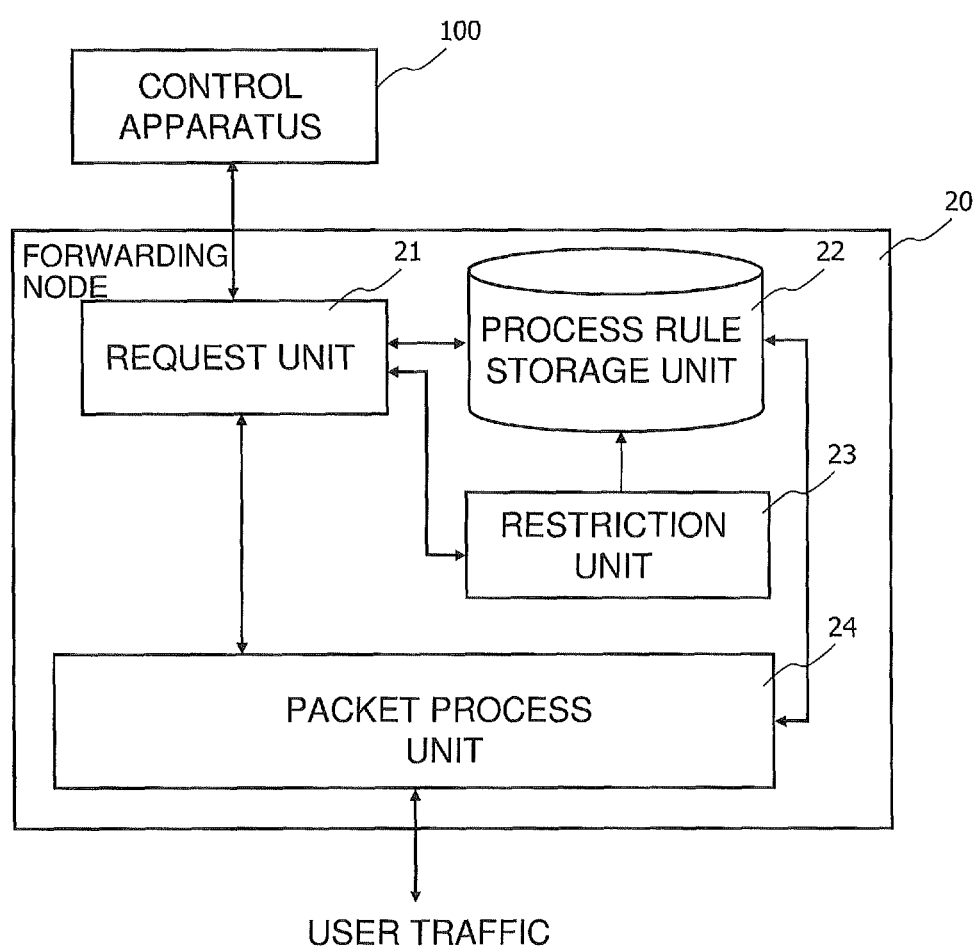
FIG. 1 illustrates an outline of the present invention.

First, an outline of the present invention will be described. As illustrated in FIG. 1, the present invention can be realized by a communication system comprising: a control apparatus 100 setting a process rule defining a process content appropriate to a received packet in a forwarding node: and a forwarding node 20 comprising: a process rule storage unit 22 storing the process rule; and a packet process unit 24 processing a received packet. More specifically, the forwarding node 20 comprises: a request unit 21 transmitting a process rule setting request to the control apparatus if the received packet is a first packet for which the process rule is not set; and a restriction unit 23 restricting transmission of the process rule setting request for a second packet satisfying a predetermined condition. The reference characters in this outline are used only as examples to facilitate comprehension and are not intended to limit the present invention to the illustrated modes.

Specifically, as illustrated in FIG. 2, upon receiving a data packet from an external node (S001 in FIG. 2), the forwarding node 20 buffers the received packet (first packet), and the request unit 21 of the forwarding node 20 transmits a process rule setting request to the control apparatus 100 for the received packet (first packet) (S002 in FIG. 2). In addition, the restriction unit 23 of the forwarding node 20 stops (restricts transmission of) a process rule setting request for a second packet satisfying a predetermined condition (S003 in FIG. 2).

Whether to stop (restrict transmission) of the process rule setting request can be determined by the packet (first packet) received in S001 in FIG. 2. For example, (transmission of) the process rule setting request can be stopped (restricted) when the forwarding node 20 receives: subsequent packets belonging to the flow of the received packet (first packet); packets transmitted from the source of the received packet (first packet) (packets having source information identical to that of the first packet); or packets received through a certain port. Namely, the condition may be referred to as a filtering condition for filtering packets for which transmission of a process rule setting request is stopped. In addition, while the predetermined condition can be created by using a feature such as a packet header of the first packet, creation of the predetermined condition is not limited to the above examples using the first packet. For example, after the first packet is received, (transmission of) a process rule setting request may be stopped or restricted for packets inputted through ports other than the port that has received the first packet.

In this way, as illustrated in FIG. 2, even if the forwarding node 20 receives packets for which the process rule is not set from the external node, transmission of process rule setting requests to the control apparatus 100 is inhibited.

Subsequently, if a process rule is set by the control apparatus 100 (S004 in FIG. 2), the forwarding node 20 starts forwarding the packet received and buffered in S001 in accordance with the set process rule (S005 in FIG. 2). In addition, a subsequent packet transmitted from the external node (a packet subsequent to the packet received in S001 in FIG. 2) is forwarded in accordance with the process rule set in S004 in FIG. 2 (S007-1 and S007-2 in FIG. 2).

In this way, transmission of a flood of process rule setting requests from a certain forwarding node to the control apparatus 100 can be prevented. In addition, depending on the setting set in S003 in FIG. 2 for inhibiting transmission of process rule setting requests (for example, inhibiting the request for packets having a source address identical to that of the packet for which a process rule setting request has been transmitted), DoS attacks against the control apparatus 100 can be made difficult.

First Exemplary Embodiment

Next, a first exemplary embodiment of the present invention will be described in detail with reference to the drawings.

FIG. 3 illustrates a configuration of a forwarding node 200 according to the first exemplary embodiment of the present invention. As illustrated in FIG. 3, the forwarding node 200 is composed of a forwarding process management unit 209 and a forwarding process unit 206.

The forwarding process management unit 209 includes a communication unit 201, a tentative process rule setting policy management unit 202, a tentative process rule setting policy storage unit 203, a process rule management unit 204, and a process rule storage unit 205.

The communication unit 201 is a unit that realizes communication with a control apparatus that sets a process rule in the forwarding node 200.

The tentative process rule setting policy management unit 202 is a unit that manages tentative process rule setting policies stored in the tentative process rule setting policy storage unit 203. In addition, when notified by the forwarding process unit 206 that no process rule matching a received packet is registered in the process rule storage unit 205, the tentative process rule setting policy management unit 202 refers to a tentative process rule setting policy stored in the tentative process rule setting policy storage unit 203, creates a tentative process rule, and instructs the process rule management unit 204 to set (add) the created tentative process rule.

FIG. 4 illustrates examples of the tentative process rule setting policies stored in the tentative process rule setting policy storage unit 203. The examples in FIG. 4 are created based on the assumption that a new flow can be generated through ports #1, #2, and #3 of the forwarding node 200 and a new flow cannot be generated through ports #4, #5, and #6.

Policy #1 in FIG. 4 defines a tentative process rule setting policy for received packets inputted through an input port #1, #2, or #3. Specifically, based on this set policy, the forwarding node 200 discards packets that match conditions where an input port, a source MAC (Media Access Control) address, and a source IP are identical to that of the received packet whose process rule is not registered, the other fields are wildcards, and the effective period (timer) is 10 seconds. In this case, the tentative process rule setting policy management unit 202 creates a process rule having a matching rule, an action (discard), and a time-out value that correspond to the conditions and instructs the process rule management unit 204 to set the process rule. In this way, for packets inputted through a port through which a new flow can be generated, detailed conditions are set. Thus, process rule setting requests are inhibited only for a flow for which a process rule setting request is being requested or for a flow(s) related to such flow, while process rule setting requests are allowed if other new flow(s) is (are) inputted.

Similarly, policy #2 in FIG. 4 defines a tentative process rule setting policy for received packets inputted through an input port #4, #5, or #6. In contrast to the above policy #1, it is preferable that process rule setting requests be comprehensively inhibited for packets received through ports through which a new flow cannot be generated. In this way, for example, the control apparatus can detect information (MAC address, IP address, and the like) about terminals executing unauthorized access real time. As a result, unauthorized traffic can be inhibited.

The process rule management unit 204 is a unit that, for example, sets, changes, and deletes stored process rules, in accordance with a process rule setting message received from the control apparatus. In addition, when notified by the forwarding process unit 206 that no process rule matching a received packet is registered in the process rule storage unit 205, the process rule management unit 204 transmits a process rule setting request to the control apparatus via the communication unit 201. In addition, if instructed by the tentative process rule setting policy management unit 202 to set a tentative process rule, the process rule management unit 204 registers the tentative process rule in the process rule storage unit 205.

FIG. 5 illustrates examples of the process rules stored in the process rule storage unit 205. In each process rule in FIG. 5, a matching rule for identifying a flow, a process content (action) applied to the matching rule, priority order information about each entry are associated. Based on these process rules, for example, upon receiving a packet matching Flow#1, the forwarding node 200 forwards the packet to port#1. In FIG. 5, "Tentative Flow#1" represents the above tentative process rule. If a forwarding node, in which process rules having a priority order as illustrated in FIG. 5 are set, receives packets matching Flow#1 or Flow#2, the forwarding node executes the respective specified actions. However, if the forwarding node receives packets matching Tentative Flow#1, instead of Flow#1 or Flow#2, the forwarding node discards the packets. If the forwarding node receives packets that do not correspond to any one of these matching rules, the forwarding node transmits a process rule setting request to the control apparatus.

The forwarding process unit 206 includes: a process rule search unit 207 referring to the process rule storage unit 205 to search for a process rule having a matching rule matching a received packet; and an action execution unit 208 executing a process content (action) defined in the searched process rule. When no process rule matching the received packet is registered in the process rule storage unit 205, the forwarding process unit 206 sends a notification to the forwarding process management unit 209.

The forwarding node 200 as described above can be realized by adding the tentative process rule setting policy management unit 202 and the tentative process rule setting policy storage unit 203 to an OpenFlow switch in Non Patent Literatures 1 and 2 and by causing the forwarding process unit 206 to send a notification to the tentative process rule setting policy management unit 202 if no process rule matching a received packet is registered in the process rule storage unit 205.

In addition, the individual units (process means) of the forwarding node 200 illustrated in FIG. 3 may be realized by a computer program(s) causing a computer mounted in the forwarding node 200 to use hardware thereof and to execute the above individual processes.

Next, an operation according to the present exemplary embodiment will be described in detail with reference to the drawings. First, an operation of setting a tentative process rule setting policy will be described.

Setting of Tentative Process Rule Setting Policy

Figure 6:
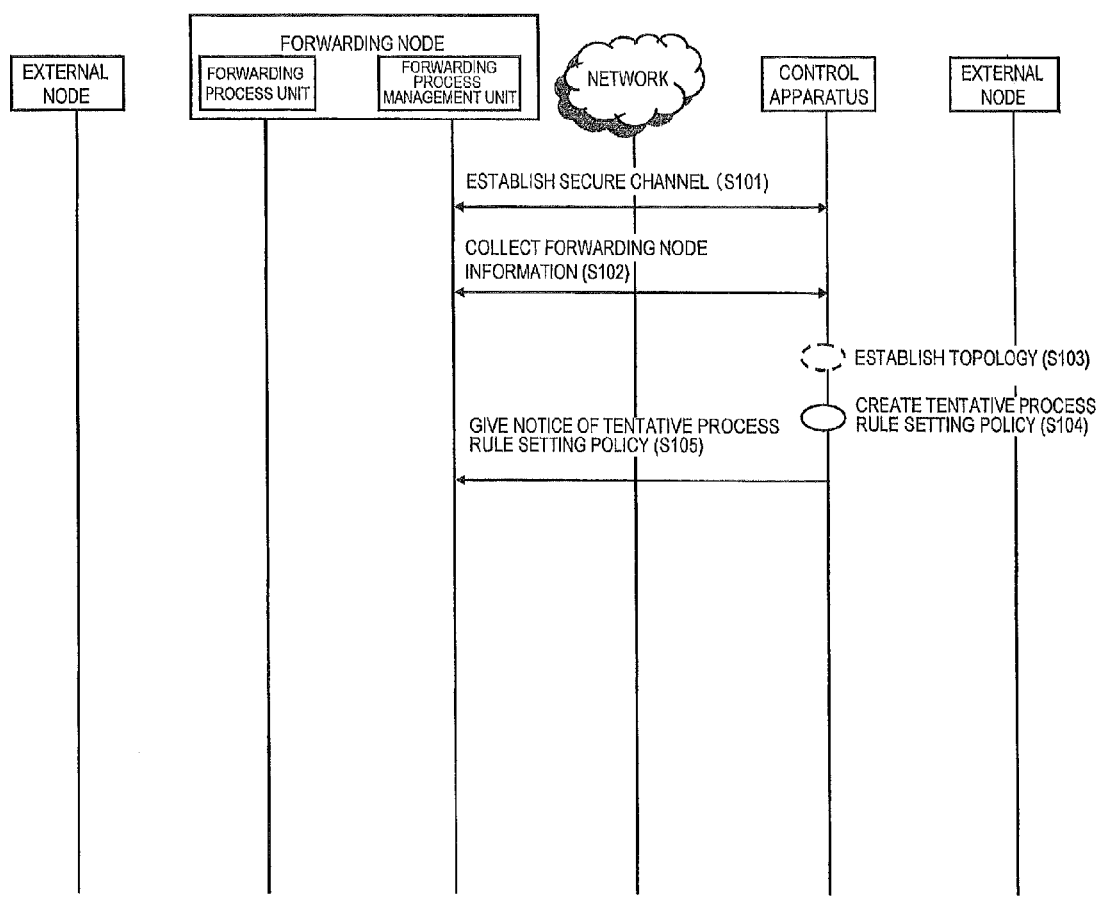
FIG. 6 is a sequence diagram illustrating an operation according to the first exemplary embodiment of the present invention.

FIG. 6 is a sequence diagram illustrating an operation of setting a tentative process rule setting policy in the tentative process rule setting policy storage unit 203 of the forwarding node 200.

First, if the forwarding node 200 is newly connected to a network or if settings of the forwarding node 200 are changed, a secure channel is established with the control apparatus (S101 in FIG. 6). Next, the control apparatus collects information about forwarding capabilities and the like of the forwarding node 200 (S102 in FIG. 6). In S102, the forwarding node 200 may explicitly notify the control apparatus that the forwarding node 200 includes the tentative process rule setting policy management unit 202. If the control apparatus and the forwarding node 200 are configured based on the Open-Flow controller and the OpenFlow switch in Non Patent Literatures 1 and 2, Feature Request/Reply messages in Non Patent Literature 2 can be used for the collection of information about forwarding capabilities and the like of the forwarding node.

Next, the control apparatus creates a network topology including the forwarding node 200, based on the collected information or prepared network configuration information (S103 in FIG. 6).

Next, the control apparatus creates a tentative process rule setting policy that needs to be set in each forwarding node 200. An identical tentative process rule setting policy does not need to be set in each of the forwarding nodes 200. The control apparatus can set a different tentative process rule setting policies in each forwarding node 200, in view of the location of each forwarding node 200 on a network topology or traffic information (for example, traffic type or related statistics information). For example, if a forwarding node is located where direct reception of packets from unknown external node(s) is possible, for a packet inputted through a port available to these external node(s), information about an external node transmitting the packet is added in the matching rule, and a tentative process rule setting policy having contents to stop transmission of a process rule setting request for a certain period is set. In contrast, if a forwarding node is located where direct reception of packets from unknown external nodes is not possible, for a packet inputted through an unused port, external node information is not added in the matching rule, and a tentative process rule setting policy having contents to stop (transmission of) a process rule setting request for a certain period is set. In addition, for example, in the case of a group of forwarding nodes connected to a plurality of server apparatuses providing different services, if a forwarding node receives a packet that is not associated with any of the services provided by the connected server apparatuses, the control apparatus can set a tentative process rule setting policy for stopping (transmission of) a process rule setting request. In this case, since the server apparatuses connected to the individual forwarding nodes provide different services, a different tentative process rule setting policy can be set for each forwarding node.

Finally, the control apparatus notifies the forwarding node 200 of the created tentative process rule setting policy (S105 in FIG. 6). Upon receiving the tentative process rule setting policy, the forwarding node 200 stores the tentative process rule setting policy in the tentative process rule setting policy storage unit 203.

As described above, each time the forwarding node 200 is added or changed, a tentative process rule setting policy can be configured. In this way, a tentative process rule setting policy based on an updated network topology can be set.

In S104 and S105 in FIG. 6, for other forwarding nodes in which tentative process rule setting polices have already been set, the tentative process rule setting policies may be reviewed and new tentative process rule setting policies may be set. In this way, even if a new forwarding node is added to a network or if settings of a forwarding node are changed, tentative process rule setting policies reflecting a network topology change can be applied.

The above sequence for setting a tentative process rule setting policy is merely one example of the method for setting the tentative process rule setting policy. Thus, the present invention is not particularly limited to such example. For example, a network administrator may set a tentative process rule setting policy in each forwarding node 200, based on a known network topology. Alternatively, a tentative process rule setting policy may be set in each forwarding node 200 in advance as a default setting before shipment thereof.

Figure 7:
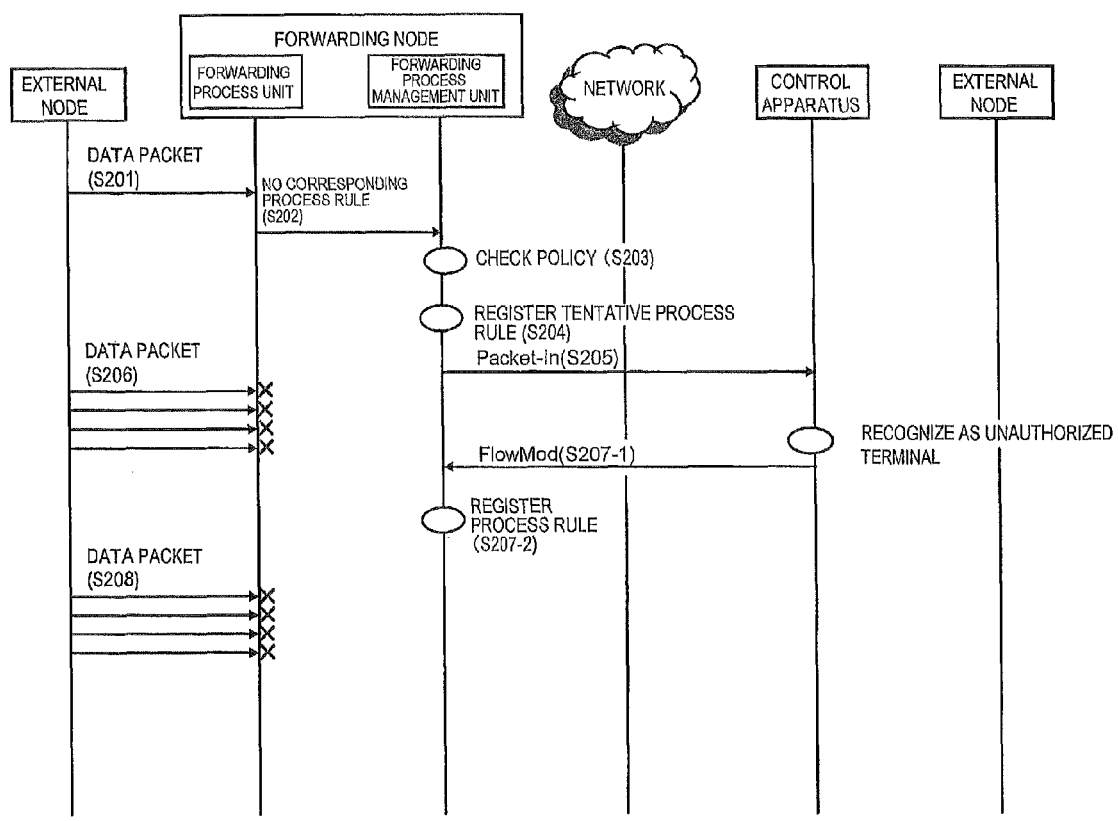
FIG. 7 is a sequence diagram illustrating an operation according to the first exemplary embodiment of the present invention.

Operation sequence 1 using tentative process rule setting policy Next, an operation of a forwarding node using a tentative process rule setting policy set as described above will be described. FIG. 7 is a sequence diagram illustrating an operation when a forwarding node 200 continuously receives packets as a possible DoS attack.

In FIG. 7, first, when the forwarding node 200 receives a data packet from an external node (S201 in FIG. 7), the forwarding process unit 206 of the forwarding node 200 searches the process rule storage unit 205 for a process rule matching the received packet. In this case, since the received packet is an unknown data packet, the forwarding process unit 206 notifies the forwarding process management unit 209 that no corresponding process rule has been found (S202 in FIG. 7).

Upon receiving the notification, in the forwarding process management unit 209, the tentative process rule setting policy management unit 202 refers to the tentative process rule setting policy storage unit 203, selects a tentative process rule setting policy corresponding to the received packet, and creates a tentative process rule (S203 in FIG. 7; policy check). Next, the tentative process rule setting policy management unit 202 requests the process rule management unit 204 to set the created tentative process rule.

Next, the process rule management unit 204 registers the created tentative process rule in the process rule storage unit 205 (S204 in FIG. 7). This example will be hereinafter described, assuming that policy #1 in FIG. 4 is selected. Namely, in accordance with the set tentative process rule, packets that are inputted through the same input port and that have the same source MAC address and source IP address as the data packet received in S201 in FIG. 7 are discarded (see Tentitive Flow#1 in FIG. 5).

In addition, since the forwarding node 200 has received an unknown data packet, the process rule management unit 204 transmits a process rule setting request to the control apparatus (S205 in FIG. 7; Packet-In).

After the tentative process rule is set in S204 in FIG. 7, the forwarding node 200 processes data packets received from external nodes, in accordance with the existing process rule and tentative process rule. Thus, subsequent packet(s) sent from the external node is (are) processed and discarded in accordance with the tentative process rule.

On the other hand, upon receiving the process rule setting request in S205 in FIG. 7, the control apparatus creates a process rule corresponding to the data packet received from the forwarding node 200 and sets the process rule in the forwarding node 200 (S207-1 in FIG. 7; FlowMod). In this example, as in the tentative process rule set in S204 in FIG. 7, a process rule is set so that packets that are inputted through the same input port and that have the same source MAC address and source IP address as the data packet received in S201 in FIG. 7 are discarded.

Upon receiving the process rule from the control apparatus, the process rule management unit 204 of the forwarding node 200 registers the process rule in the process rule storage unit 205 (S207-2 in FIG. 7; registration of process rule).

Thus, since data packets transmitted from the external node are continuously discarded (S208 in FIG. 7), process rule setting requests are inhibited.

Operation Sequence 2 Using Tentative Process Rule Setting Policy

Figure 8:
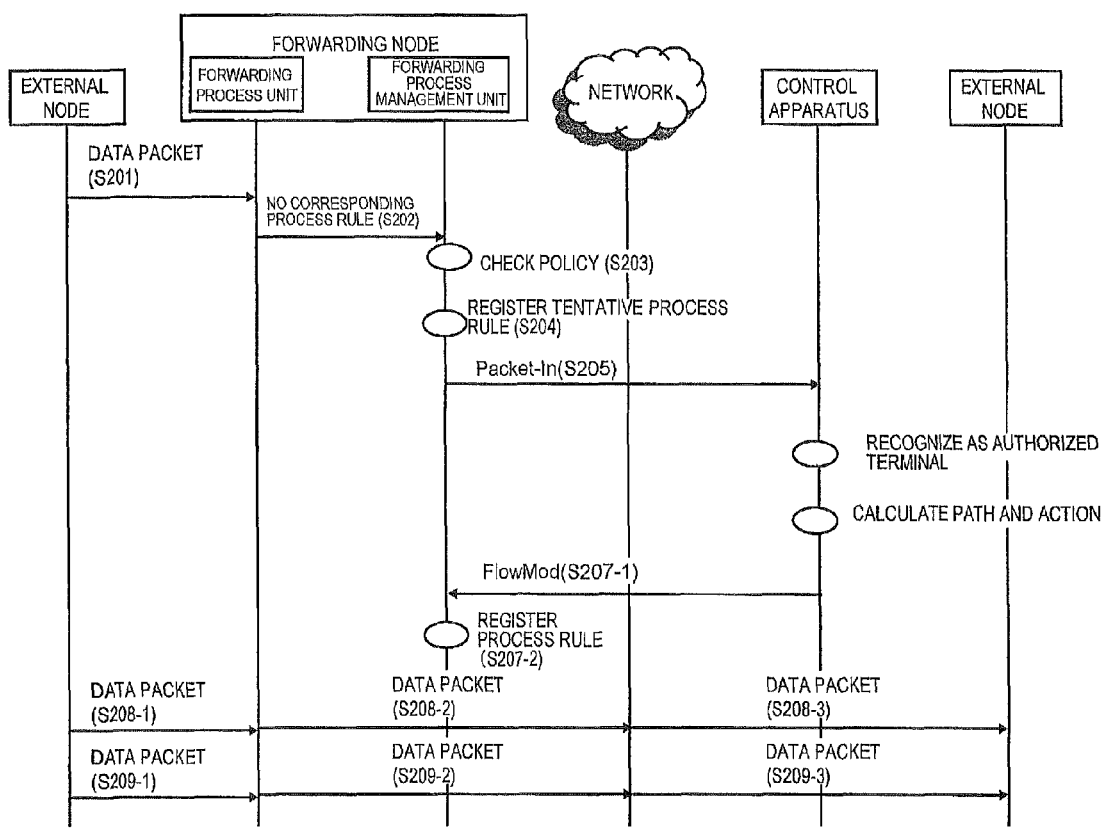
FIG. 8 is a sequence diagram illustrating an operation according to the first exemplary embodiment of the present invention.

FIG. 8 is a sequence diagram illustrating an operation when the forwarding node 200 receives a packet from an authorized user terminal. From the data packet reception (S201) to the process rule setting request (S205; Packet-In), the operation is the same between FIGS. 7 and 8.

Upon receiving a process rule setting request in S205 in FIG. 8, the control apparatus creates a process rule corresponding to the data packet received from the forwarding node 200 and sets the process rule in the forwarding node 200 (S207-1 in FIG. 8; FlowMod). In this case, the following description will be described, assuming that it has been recognized based on a feature of the data packet that the data packet has been transmitted from an authorized user terminal (at least, not from an unauthorized terminal). Thus, a path (route) of the data packet to the destination and actions realizing the path (route) are calculated. Namely, a process rule defining actions for forwarding subsequent packets belonging to the flow of the data packet in FIG. 2 to the next hop is set.

Upon receiving the process rule from the control apparatus, the process rule management unit 204 of the forwarding node 200 registers the process rule in the process rule storage unit 205 (S207-2 in FIG. 8; registration of process rule).

As a result, subsequent packets transmitted from the external node are processed and forwarded to the destination, in accordance with the process rule (S208-1 to S209-3 in FIG. 8).

(Operation of Forwarding Node)

Figure 9:
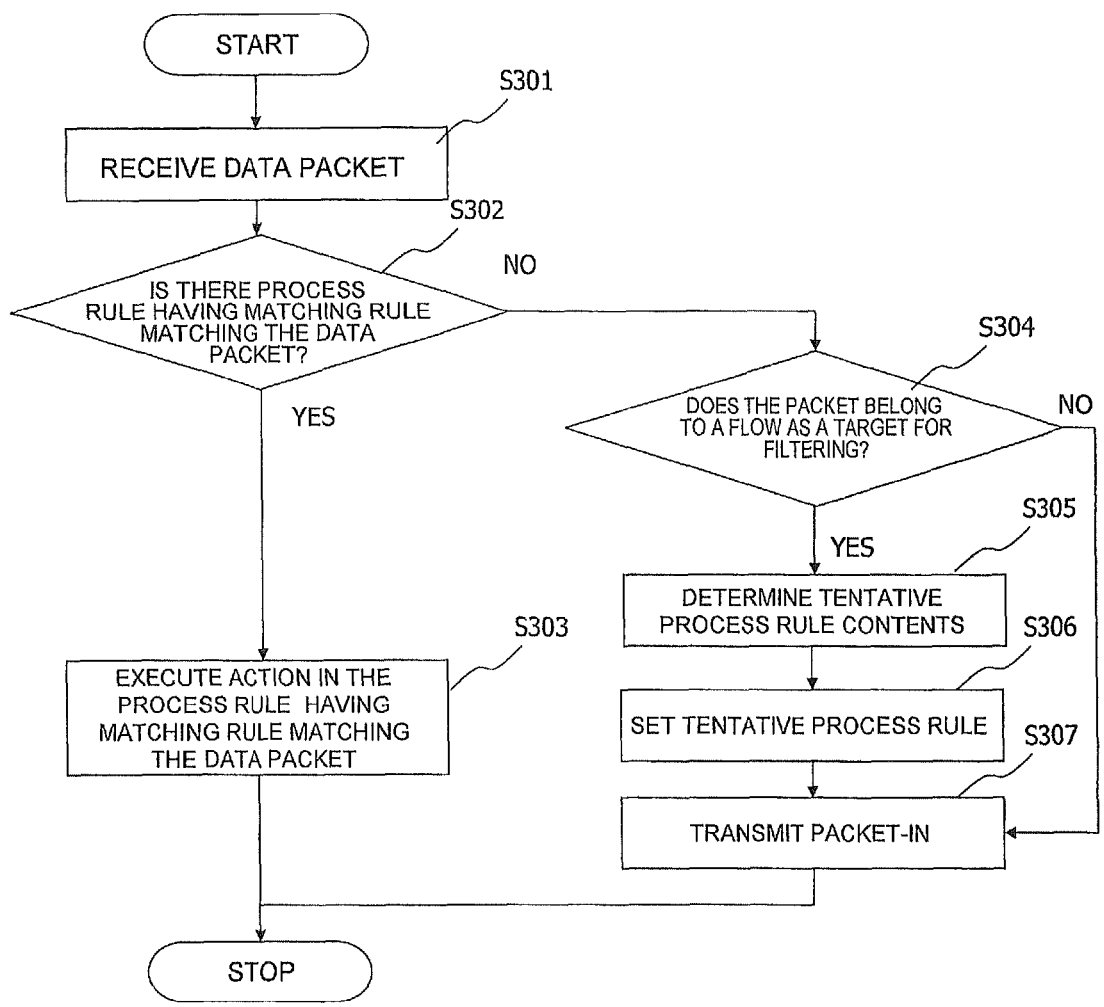
FIG. 9 is a flow chart illustrating processes executed by the forwarding node in FIGS. 7 and 8.

Next, processes executed by the forwarding node in the above sequences will be described in detail with reference to the drawing. FIG. 9 is a flow chart illustrating processes executed by the forwarding node in FIGS. 7 and 8.

First, upon receiving a data packet from an external node or another forwarding node (step S301), the forwarding node 200 searches the process rule storage unit 205 for a process rule having a matching rule matching the received packet.

As a result of the search, if a process rule having a matching rule matching the received packet is found (Yes in step S302), the forwarding node 200 executes a process content (action) defined in the process rule (step S303).

On the other hand, as a result of the search, if no process rule having a matching rule matching the received packet is found (No in step S302), the forwarding node 200 refers to the tentative process rule setting policy storage unit 203 to check whether the received packet corresponds to a flow for which a tentative process rule needs to be set (step S304).

If the received packet does not correspond to a flow for which a tentative process rule needs to be set, for example, if no entry having flow information in FIG. 4 that matches the received packet is registered in the tentative process rule setting policy storage unit 203 (No in step S304), the forwarding node 200 transmits a process rule setting request to the control apparatus, without setting a tentative process rule (step S307).

On the other hand, as a result of the checking, if the received packet corresponds to a flow for which a tentative process rule needs to be set, for example, if an entry having flow information in FIG. 4 that matches the received packet is registered in the tentative process rule setting policy storage unit 203 (Yes in step S304), the forwarding node 200 refers to a tentative process rule setting policy defined in this entry in the tentative process rule setting policy storage unit 203 and creates a tentative process rule (step S305). Next, the forwarding node 200 sets the created tentative process rule in the process rule storage unit 205 (step S306).

Next, the forwarding node 200 transmits a process rule setting request to the control apparatus (step S307).

As described above, according to the present exemplary embodiment, by using granularity defined in a tentative process rule setting policy, transmission of process rule setting request(s) to the control apparatus can be controlled for any packet(s) subsequent to an unknown packet.

In the above exemplary embodiment, after a tentative process rule is set, a process rule setting request is transmitted. However, after a process rule setting request is transmitted, a tentative process rule may be set.

In addition, in the above exemplary embodiment, as a process content (action) in a tentative process rule, a packet is discarded. However, other process contents (actions) may be defined to inhibit transmission of a process rule setting request to the control apparatus. Examples of the process contents include buffering of a packet, forwarding on a predetermined route, and packet return.

In addition, in the above exemplary embodiment, the control apparatus that has received a process rule setting request executes a process rule setting operation. However, when transmitting a process rule setting request, the forwarding node 200 may notify the control apparatus of contents set as a tentative process rule. In this way, instead of the process rule setting operation, the control apparatus can execute a tentative process rule acknowledgement operation (namely, setting of a process rule can be omitted).

Second Exemplary Embodiment

Next, a second exemplary embodiment of the present invention will be described in detail with reference to the drawings. The second exemplary embodiment can be obtained by modifying the above first exemplary embodiment.

In the above first exemplary embodiment, the forwarding node 200 separately manages process rules and tentative process rule setting policies. However, the second exemplary embodiment of the present invention differs from the first exemplary embodiment in that these rules and policies are integrally managed. Hereinafter, the second exemplary embodiment will be described with a focus on the difference from the first exemplary embodiment.

Figure 10:
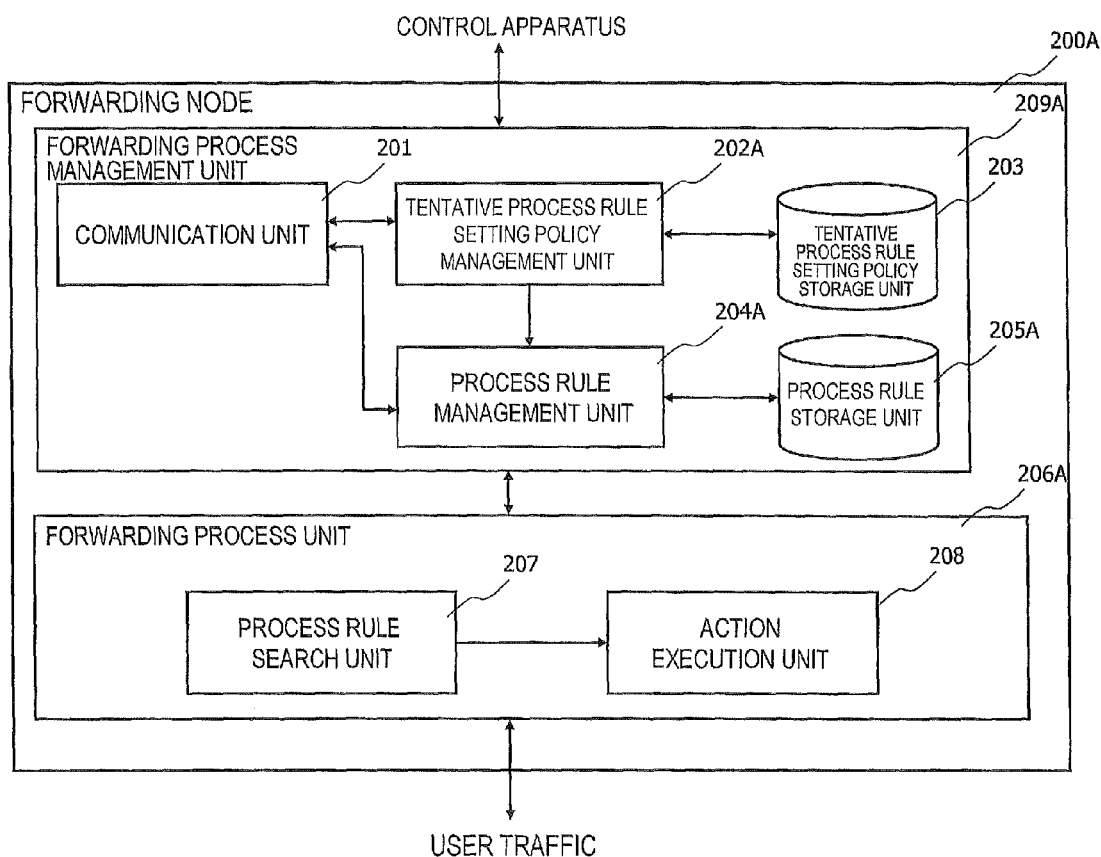
FIG. 10 is a block diagram illustrating a configuration of a forwarding node according to a second exemplary embodiment of the present invention.

FIG. 10 is a block diagram illustrating a configuration of a forwarding node 200A according to the second exemplary embodiment of the present invention. The forwarding node 200A differs from the forwarding node 200 of the first exemplary embodiment illustrated in FIG. 3 in that, when the forwarding node 200 receives a data packet from an external node and a forwarding process unit 206A of the forwarding node 200 searches a process rule storage unit 205A for a process rule matching the received packet, the forwarding process unit 206A checks whether or not the received packet corresponds to a flow for which a tentative process rule needs to be set (S304 in FIG. 9).

FIG. 11 illustrates entries stored in the process rule storage unit 205A of the forwarding node 200A according to the present exemplary embodiment. These entries are different from the process rule entries stored in the process rule storage unit 205 of the forwarding node 200 according to the first exemplary embodiment in FIG. 5 in that entries indicated by Flow#N and Flow#N+1 are added in the entries in FIG. 11. Flow#N and Flow#N+1 correspond to the flow information (inport=#1 or #2 or #3, for example) in FIG. 4, and contents of the tentative process rule setting policies that need to be set are described in the respective action fields.

For example, if the forwarding node 200A receives an unknown packet that does not match a higher-priority process rule (Flow#1, #2) or a tentative process rule (Tentative Flow#1) but matches the condition that inport=#4 or #5 or #6 in the matching rule, the forwarding process unit 206A notifies a tentative process rule setting policy management unit 202A of reception of an unknown packet to which Policy#2 needs to be applied. After notified, the notified tentative process rule setting policy management unit 202A directly refers to the corresponding tentative process rule setting policy Policy#2 in the tentative process rule setting policy storage unit 203, without searching for a tentative process rule setting policy to be applied. Next, the notified tentative process rule setting policy management unit 202A requests the process rule management unit 204A to set (add) the tentative process rule (Tentative Flow#2) in the process rule storage unit 205A.

Subsequently, received packets matching a matching rule of the tentative process rule (Tentative Flow#2) are processed in accordance with the process content (action) defined in the tentative process rule (Tentative Flow#2).

As described above, according to the present exemplary embodiment, in addition to the same meritorious effects of the first exemplary embodiment, the speed of an operation for searching for a tentative process rule setting policy by the forwarding node 200A can be increased. In addition, according to the present exemplary embodiment, by using a normal process rule setting message (for example, Flow Mod of OpenFlow), a tentative process rule setting policy can be set.

In addition, in the above exemplary embodiment, the tentative process rule setting policy storage unit 203 and the process rule storage unit 205A are separately arranged and managed. However, by extending the forwarding node so that tentative process rules can be stored in the action field in FIG. 11, the tentative process rule setting policy storage unit 203 and the process rule storage unit 205A can be integrated.

While exemplary embodiments of the present invention have thus been described, the present invention is not limited thereto. Further variations, substitutions, or adjustments can be made without departing from the basic technical concept of the present invention. For example, while each of the exemplary embodiments has been described based on an example where a single forwarding node is focused and a tentative process rule setting policy is applied, a different tentative process rule setting policy can be set to each of the forwarding nodes forming a network.

In addition, the above exemplary embodiments have been described based on an example where two tentative process rule setting policies exist. However, a single tentative process rule setting policy may be used. Alternatively, 3 or more tentative process rule setting policies may be prepared. In addition, if a plurality of tentative process rule setting policies are set, a multistage policy configuration may be adopted. For example, tentative process rules may be added until the number of the tentative process rules exceeds a certain number. If the number of the tentative process rules exceeds a certain number, tentative process rules are not added. Instead, a tentative process rule for uniformly discarding packets inputted through a specified input port is substituted.

In addition, while application fields of the forwarding nodes 200 and 200A according to the present invention are not particularly described in each of the above exemplary embodiments, the forwarding nodes according to the present invention can suitably be arranged at edges of a mobile backhaul, for example. In this way, the control apparatus can handle process rule setting requests generated based on new packets sent from various authorized base stations, while avoiding reception of a flood of setting requests from an unauthorized communication apparatus as a DoS attack.

Figure 12:
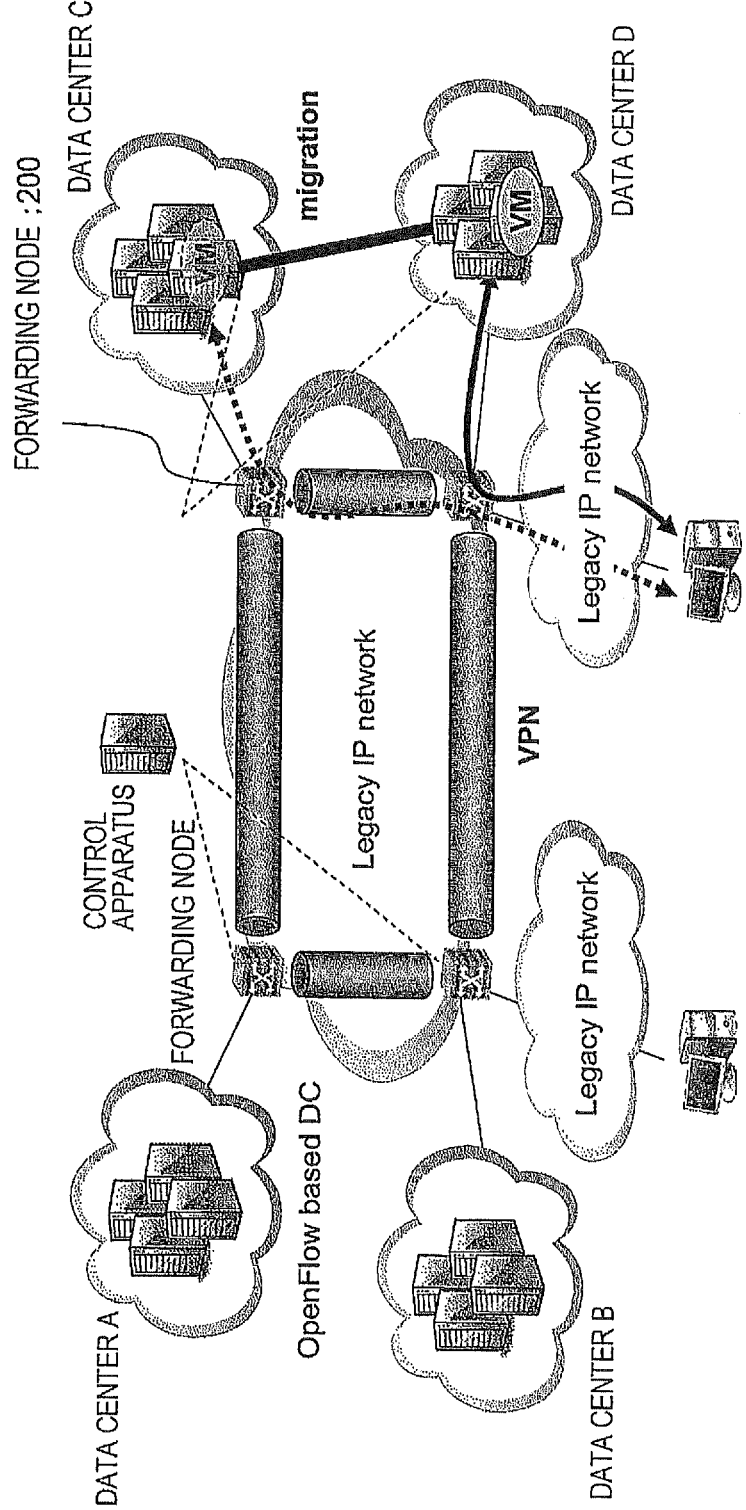
FIG. 12 illustrates a configuration of a communication system to which forwarding nodes according to the present invention are applicable.

In addition, for example, as illustrated in FIG. 12, the forwarding nodes 200 and 200A according to the present invention can suitably be arranged at edges of a wide-area data center. In this case, too, reception of a flood of process rule setting requests in the form of bursty traffic can be avoided.

The entire disclosures of the above Patent Literature and Non Patent Literatures are incorporated herein by reference thereto. Modifications and adjustments of the exemplary embodiments are possible within the scope of the overall disclosure (including claims) of the present invention and based on the basic technical concept of the invention. Various combinations and selections of various disclosed elements are possible within the scope of the claims of the present invention. That is, the present invention of course includes various variations and modifications that could be made by those skilled in the art according to the overall disclosure including the claims and the technical concept.

Finally, mode examples of the present invention will be summarized.
(First Mode)
A communication system, comprising:
a control apparatus setting a process rule defining a process content appropriate to a received packet in a forwarding node; and
at least one forwarding node, comprising:
a packet process unit processing a received packet in accordance with the process rule;
a request unit transmitting a process rule setting request to the control apparatus if the received packet is a first packet for which the process rule is not set; and
a restriction unit restricting transmission of the setting request if the first packet is a second packet satisfying a predetermined condition.
(Second Mode)
The communication system according to the first mode;
wherein the restriction unit inhibits transmission of a process rule setting request from the request unit by adding a predetermined process rule defining a process to be applied to the received packet.
(Third Mode)
The communication system according to the second mode;
wherein a process to be applied to the second packet is packet discard.
(Fourth Mode)
The communication system according to any one of the first to third modes;
wherein the restriction unit restricts a process rule setting request operation by the request unit, based on a preset policy.
(Fifth Mode)
The communication system according to any one of the second to fourth modes;
wherein the forwarding node adds the predetermined process rule, based on a preset policy.
(Sixth Mode)
The communication system according to the fourth or fifth mode;
wherein the control apparatus sets the policy in the forwarding node, based on a location of the forwarding node on a network topology or traffic information.
(Seventh Mode)
The communication system according to the sixth mode;
wherein the control apparatus updates the policy set in the forwarding node when a network topology including the forwarding node is changed.
(Eighth Mode)
The communication system according to any one of the fourth to seventh modes;
wherein the policy is configured by associating a matching rule for identifying the second packet with process contents for transmitting a process rule setting request to the control apparatus and adding the predetermined process rule.

(Ninth Mode)

The communication system according to the eighth mode; wherein the forwarding node refers to a table storing the policy and the process rule, searches for an entry matching a received packet, and processes the received packet or adds the predetermined process rule.

(Tenth Mode)

The communication system according to any one of the first to ninth modes;

wherein, when transmitting a process rule setting request to the control apparatus, the forwarding node notifies the control apparatus of contents of the predetermined process rule; and wherein the control apparatus sets a new process rule or acknowledges the predetelmined process rule for the first packet for which the process rule setting request is received.

(Eleventh mode)

A forwarding node, comprising:

a packet process unit processing a received packet in accordance with a process rule defining a process content appropriate to a received packet;

a request unit transmitting a process rule setting request to the control apparatus with respect to a first packet, among the received packet(s), for which the process rule is not set; and a restriction unit restricting transmission of the setting request if the first packet is a second packet satisfying a predetermined condition.

(Twelfth Mode)

The forwarding node according to the eleventh mode;

wherein the restriction unit inhibits transmission of a process rule setting request from the request unit by adding a predetermined process rule defining a process to be applied to the received packet.

(Thirteenth mode)

A received packet process method, comprising:

transmitting, when processing a received packet in accordance with a process rule defining a process content appropriate to a received packet if no process rule matching the received packet is set, a process rule setting request to a predetermined control apparatus for a first packet for which the process rule is not set; and restricting transmission of the setting request if the first packet is a second packet satisfying a predetermined condition.

(Fourteenth mode)

A program, causing a computer that is included in a forwarding node comprising a packet process unit processing a received packet in accordance with a process rule defining a process content appropriate to a received packet to execute:

transmitting a process rule setting request to a predetermined control apparatus for a first packet for which the process rule is not set; and restricting transmission of the setting request if the first packet is a second packet satisfying a predetermined condition.

(Fifteenth mode)

A communication system, comprising:

a control apparatus setting a process rule defining a process content appropriate to a received packet in a forwarding node; and a forwarding node comprising:

a packet process unit processing a received packet in accordance with the process rule;

a request unit transmitting a process rule setting request to the control apparatus if the received packet is a first packet for which the process rule is not set; and a restriction unit restricting transmission of the setting request for a second packet satisfying a predetermined condition.

REFERENCE SIGNS LIST 20, 200, 200A forwarding node
21 request unit
22, 205, 205A process rule storage unit
23 restriction unit
24 packet process unit
100 control apparatus
201 communication unit
202, 202A tentative process rule setting policy management unit
203 tentative process rule setting policy storage unit
204, 204A process rule management unit
206, 206A forwarding process unit
207 process rule search unit
208 action execution unit
209, 209A forwarding process management unit

What is claimed is:

1. A communication system, comprising:
a control apparatus setting a process rule appropriate to a received packet in a plurality of forwarding nodes; and
at least one of the plurality of forwarding nodes including a memory and a processor that is configured to execute instructions stored in the memory, said at least one of the plurality of forwarding nodes comprising:
a packet process unit processing a received packet in accordance with the process rule;
a request unit transmitting a process rule setting request to the control apparatus if a first received packet for which the process rule is not set; and
a restriction unit restricting transmission of the process rule setting request, to the control apparatus, for a second received packet satisfying a condition obtained from the first received packet;
wherein the restriction unit inhibits transmission of the process rule setting request from the request unit by adding a predetermined process rule defining a process to be applied to the received packet, and
wherein a process to be applied to the second received packet includes packet discard,
the restriction unit further comprising a policy that is configured by associating a matching rule for identifying the second received packet with process contents for transmitting a process rule setting request to the control apparatus and adding the predetermined process rule.

2. The communication system according to claim 1, wherein the restriction unit further restricts a process rule setting request operation by the request unit, based on a preset policy.

3. The communication system according to claim 1, wherein the at least one of the plurality of forwarding nodes adds the predetermined process rule, based on a preset policy.

4. The communication system according to claim 2, wherein the control apparatus sets the policy in the at least one of the forwarding nodes, based on a location of the at least one of the plurality of forwarding nodes on a network topology or traffic information.

5. The communication system according to claim 4, wherein the control apparatus updates the policy set in the at least one of the forwarding nodes when a network topology including the at least one of the plurality of forwarding nodes is changed.

6. The communication system according to claim 1, wherein the at least one of the plurality of forwarding nodes refers to a table storing the policy and the process rule, searches for an entry matching a received packet, and processes the received packet or adds the predetermined process rule.

7. The communication system according to claim 1, wherein, when transmitting a process rule setting request to the control apparatus, the at least one of the plurality of forwarding nodes notifies the control apparatus of contents of the predetermined process rule, and
  wherein the control apparatus sets a new process rule or acknowledges the predetermined process rule for the first received packet for which the process rule setting request is received.

8. A forwarding node including a memory and a processor that is configured to execute instructions stored in the memory, the forwarding node comprising:
  a packet process unit processing a received packet in accordance with a process rule appropriate to a received packet;
  a request unit transmitting a process rule setting request to a control apparatus with respect to a first received packet, among the received packet(s), for which the process rule is not set; and
  a restriction unit restricting transmission of the process rule setting request, to the control apparatus, for a second received packet satisfying a condition obtained from the first received packet,
  wherein the restriction unit inhibits transmission of the process role setting request from the request unit by adding a predetermined process rule defining a process to be applied to the received packet, and
  wherein a process to be applied to the second received packet includes packet discard,
    the restriction unit further comprising a policy that is configured by associating a matching rule for identifying the second received packet with process contents for transmitting a process rule setting request to the control apparatus and adding the predetermined process rule.

9. A received packet process method, comprising:
  transmitting, when processing a received packet in accordance with a process rule appropriate to the received packet if no process rule matching the received packet is set, a process rule setting request to a predetermined control apparatus for a first received packet for which the process rule is not set; and
  restricting transmission of the process rule setting request, to the control apparatus, for a second received packet satisfying a condition obtained from the first received packet;
  wherein said restricting comprises inhibiting transmission of the process rule setting request by adding a predetermined process rule defining a process to be applied to the received packet,
  wherein a process to be applied to the second received packet includes packet discard, and
  wherein the restriction unit further comprises a policy that is configured by associating a matching rule for identifying the second received packet with process contents for transmitting a process rule setting request to the control apparatus and adding the predetermined process rule.

10. A non-transitory computer-readable storage medium storing a program, causing a computer that is included in a forwarding node comprising a packet process unit processing a received packet in accordance with a process rule appropriate to a received packet to execute:
  transmitting a process rule setting request to a predetermined control apparatus for a first received packet for which the process rule is not set; and
  restricting the transmitting of the process rule setting request to the control apparatus for a second received packet satisfying a condition obtained from the first received packet,
  wherein said restricting comprises inhibiting transmission of the process rule setting request by adding a predetermined process rule defining a process to be applied to the received packet,
  wherein a process to be applied to the second received packet includes packet discard, and
    wherein the restriction unit further comprises a policy that is configured by associating a matching rule for identifying the second received packet with process contents for transmitting a process rule setting request to the control apparatus and adding the predetermined process rule.

11. The communication system according to claim 2, wherein the at least one of the plurality of forwarding nodes adds the predetermined process rule, based on a preset policy.

12. The communication system according to claim 3, wherein the control apparatus sets the policy in the forwarding node, based on a location of the at least one of the plurality of forwarding nodes on a network topology or traffic information.

13. The communication system according to claim 1, wherein the control apparatus controls the at least one of the plurality of forwarding nodes via a centralized network that comprises the control apparatus and the at least one of the plurality of forwarding nodes.

* * * * *